(12) United States Patent
Eckart et al.

(10) Patent No.: US 9,388,893 B1
(45) Date of Patent: Jul. 12, 2016

(54) VEHICLE DIFFERENTIAL HOUSING WITH PROTUBERANCES

(71) Applicant: GKN Driveline North America, Inc., Auburn Hills, MA (US)

(72) Inventors: John Eckart, Lake Orion, MI (US); David E. Gall, Clarkston, MI (US); Kevin J. Kaplan, Macomb, MI (US); Crittenden A. Bittick, Rochester Hills, MI (US)

(73) Assignee: GKN DRIVELINE NORTH AMERICA, INC., Auburn Hills, MI (US)

( * ) Notice: Subject to any disclaimer, the term of this patent is extended or adjusted under 35 U.S.C. 154(b) by 0 days.

(21) Appl. No.: 14/641,030

(22) Filed: Mar. 6, 2015

(51) Int. Cl.
*F16H 57/021* (2012.01)
*F16H 57/03* (2012.01)
*F16H 48/40* (2012.01)
*B60B 35/16* (2006.01)

(52) U.S. Cl.
CPC .............. *F16H 48/40* (2013.01); *B60B 35/166* (2013.01); *F16H 57/03* (2013.01)

(58) Field of Classification Search
CPC ....... F16H 48/38; F16H 48/40; F16H 57/028; F16H 57/03; B60B 35/166; Y10T 74/2186; Y10T 74/2188
See application file for complete search history.

(56) References Cited

U.S. PATENT DOCUMENTS

| | | | |
|---|---|---|---|
| 6,945,898 B2 | 9/2005 | Szuba | |
| 7,056,255 B2* | 6/2006 | Hay | F16H 48/08 475/220 |
| 7,267,629 B2* | 9/2007 | Peter | F16H 48/08 475/230 |
| 7,722,495 B1* | 5/2010 | Stanley | F16H 1/14 475/220 |
| 7,736,257 B2* | 6/2010 | Nakajima | F16H 48/08 475/230 |
| 7,827,882 B2* | 11/2010 | Kohno | F16H 48/08 475/230 |
| 7,850,567 B2* | 12/2010 | Kramer | F16D 13/52 192/70.12 |
| 7,867,126 B2* | 1/2011 | Nakajima | F16H 48/08 475/160 |
| 2015/0362055 A1* | 12/2015 | Biermann | F16H 48/40 475/230 |

FOREIGN PATENT DOCUMENTS

| | | | | |
|---|---|---|---|---|
| EP | 1460315 A2 | | 9/2004 | |
| FR | WO 03067122 A2 * | | 8/2003 | .............. F16H 48/08 |
| FR | 3012859 A1 * | | 5/2015 | .............. F16H 48/38 |

OTHER PUBLICATIONS

Photos of what is understood to be housings of vehicle components, and are believed to have been in production.

* cited by examiner

Primary Examiner — Adam D Rogers
(74) Attorney, Agent, or Firm — Jennifer M. Brumbaugh; Reising Ethington P.C.

(57) ABSTRACT

A housing of a vehicle differential, such as an automotive driveline differential, supports one or more gearsets in assembly. A wall of the housing has one or more windows that provide access to the gearset(s). One or more protuberances are situated at an exterior surface of the wall and near the window(s). The protuberance(s) provide a thickened portion in the wall to strengthen and reinforce the wall against stresses experienced during use of the vehicle differential.

15 Claims, 2 Drawing Sheets

VEHICLE DIFFERENTIAL HOUSING WITH PROTUBERANCES

TECHNICAL FIELD

The present disclosure relates generally to differentials used in vehicles, and more particularly to housings of vehicle differentials.

BACKGROUND

In general, vehicle drivelines transmit torque from a vehicle's engine to its wheels. Automotive drivelines conventionally include a differential equipped between sideshafts of a front axle, between sideshafts of a rear axle, or between sideshafts of both axles. Each axle typically includes a left sideshaft and a right sideshaft. The differential allows wheels on one sideshaft to spin faster or slower than wheels on the other sideshaft. This occurs, for instance, when an automobile is turning a corner. The differential also apportions driven torque flow between the sideshafts.

Differentials typically have one or more gearsets disposed in a housing. Designing and constructing the housing presents several challenges. The challenges are sometimes set by the original equipment manufacturer. For instance, the housing is expected to endure certain stresses experienced during its use, should satisfy certain overall mass demands, and should meet certain packaging constraints. These challenges are oftentimes inflexible, and can be at odds with one another. Moreover, a housing's design and construction should be compatible with manufacturing capabilities.

SUMMARY

In one implementation, a vehicle differential housing includes a wall with one or more windows. The window(s) may provide access to a differential gear that is disposed partly or more in the vehicle differential housing when the accompanying differential is assembled. The wall has a protuberance at an exterior surface of the wall and near the window(s). The protuberance may provide a thickened portion in the wall to strengthen the wall against stresses experienced during use of the accompanying differential. The protuberance has a greatest longitudinal extent that may be larger than a greatest lateral extent. The greatest longitudinal extent may span generally from a periphery of the window(s), and then away from the periphery. And the greatest lateral extent may span generally along a portion of the periphery.

In another implementation, a vehicle differential housing includes a wall with one or more windows. The window(s) may provide access to a differential gear that is disposed partly or more in the vehicle differential housing when the accompanying differential is assembled. The wall has a protuberance at an exterior surface of the wall and near the window(s). The protuberance may have a widened end and a narrowed end. The widened end may be situated at a periphery of the window(s). The narrowed end may be situated away from the periphery of the window(s). The protuberance may also have a first side and a second side. A shortest distance between the first side and the second side may steadily decrease from the widened end and to the narrowed end.

In yet another implementation, a vehicle differential housing includes a wall with one or more window(s). The wall has a protuberance at an exterior surface of the wall and near the window(s). The protuberance may have a widened end, a narrowed end, a first side, and a second side. A shortest distance between the first side and the second side may steadily decrease from the widened end and to the narrowed end. A longitudinal extent taken between the widened end and the narrowed end may be greater than a lateral extent of the widened end taken near a periphery of the window(s). Furthermore, a thickness of the protuberance may steadily decrease in dimension along the longitudinal extent from the widened end and to the narrowed end.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
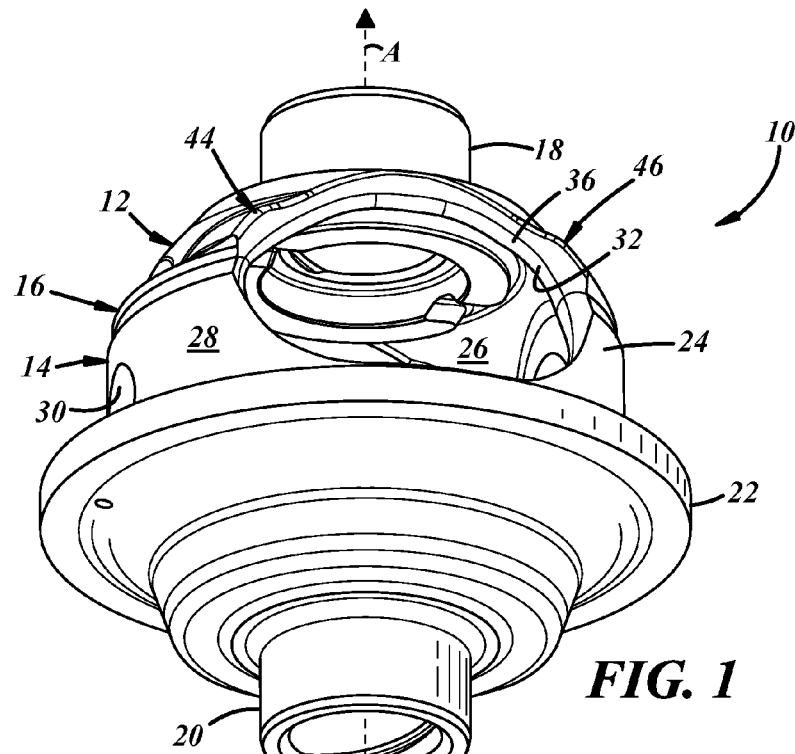
FIG. 1 is a perspective view of an embodiment of a vehicle differential housing.

Referring in more detail to the drawings, an embodiment of a vehicle differential housing 10 is designed and constructed to satisfy certain challenges confronted in automotive applications. Protuberances may be provided at areas of the differential housing 10 that often experience relatively high stress during use of the accompanying differential. The protuberances strengthen and reinforce the differential housing 10 so that the high stresses are endured, and yet the protuberances present a geometry that does not jeopardize other demands placed on the housing's design and construction. Overall mass demands and packaging constraints are still met, and the geometry of the protuberances are compatible with casting and other metalworking processes. In an automotive application, the differential housing 10 can be equipped in a front drive unit (FDU), in a rear drive unit (RDU), or somewhere else in a driveline installation.

The differential housing 10 can have different designs and constructions depending upon—among other possible factors—driveline components that interact with the accompanying differential, and differential gearsets supported in the differential housing. Although not shown in the figures, in assembly a differential gearset is disposed in an interior of the differential housing 10. The differential gearset can vary. In one example, the differential gearset includes a pair of pinion gears supported on a pin and a pair of sideshaft gears. In the example presented in FIGS. 1-3, the differential housing 10 has a one-piece structure. It can be composed of a metal material such as steel, and can be made by several manufacturing processes. Here, the differential housing 10 is made in part via a casting process and a machining process. A cast section 12 is a result of the casting process, and a machined section 14 is a result of the machining process. A lead-in circumferential edge 16 provides a transition between the cast and machined sections 12, 14.

Overall, the differential housing 10 has a somewhat cylindrical shape, as perhaps demonstrated best by FIG. 1. The cast section 12 has a more generally semi-spherical shape, and the machined section 14 has a more generally cylindrical shape. The overall cylindrical shape presents a directional coordinate system in which the term circumferentially and its related forms refer to directions along a circumference of the cylindrical shape, the term axial and its related forms refer to directions along an axis A of the cylindrical shape, and the term radial and its related forms refer to directions along a radius of the cylindrical shape. Still, the differential housing 10 could have other shapes with more planar walls and not necessarily as cylindrically- and spherically-shaped as shown in the figures, in which case the directions circumferential, axial, and radial would have analogous directions.

Figure 2:
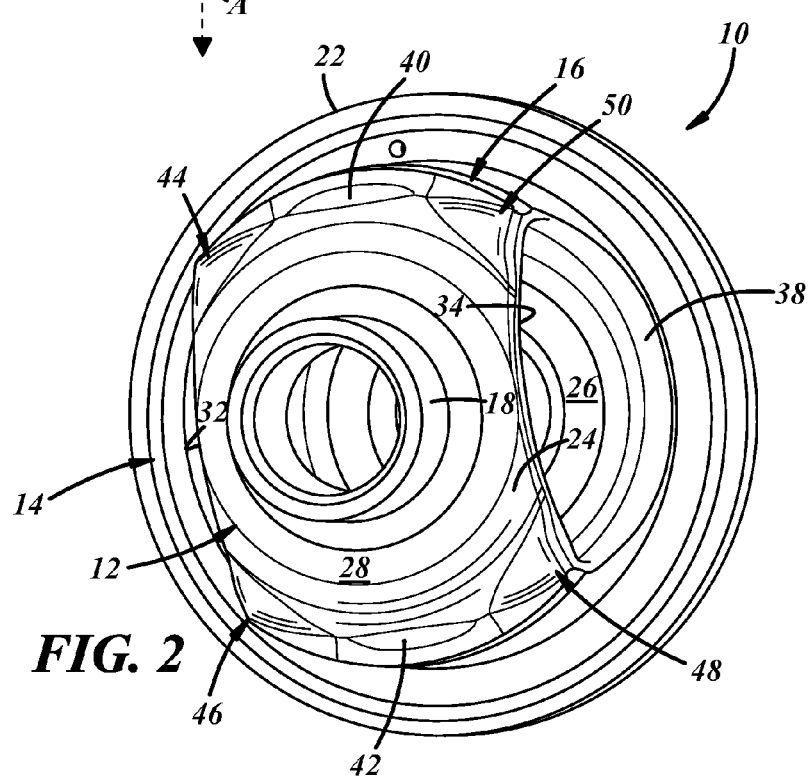
FIG. 2 is another perspective view of the vehicle differential housing of FIG. 1.
Figure 3:
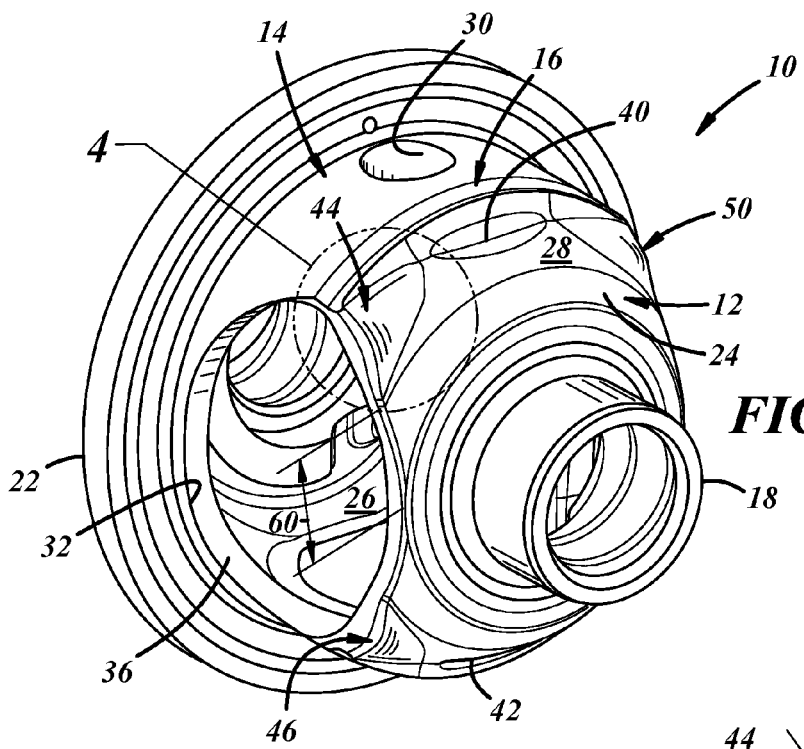
FIG. 3 is yet another perspective view of the vehicle differential housing of FIG. 1.

In general, and still referring to FIGS. 1-3, the differential housing 10 has a first sleeve 18 and a second sleeve 20. The first and second sleeves 18, 20 receive insertion of axle sideshafts when installed, and can be grooved for lubricant as shown in the figures. A flange 22 attaches a ring gear in assembly. A wall 24 defines the housing's interior and has an interior surface 26 and an exterior surface 28. The wall 24 contains openings 30 (only one shown) for receiving insertion of the differential gearset pin, and contains a first window 32 and a second window 34 that provide access to the differential gearset and exposes regions of the sideshaft gears. The first and second windows 32, 34 have respective peripheries 36, 38 that present edge surfaces around a boundary of the first and second windows. At the exterior surface 28 and at the cast section 12, the differential housing 10 has a first notch 40 and a second notch 42. The first and second notches 40, 42 are elongated oval indentations provided for manufacturing and/or assembly purposes. Still, in other examples the differential housing 10 could have more, less, and/or different designs and constructions than shown and described here; for instance, the notches could be absent in other examples.

It has been found through analysis of previously-known differential housings that a high stress area tends to exist near an intersection between the window peripheries and the lead-in edge and at the cast section. The high stresses experienced at these areas may not always fulfill requirements set by original equipment manufacturers, and, in worst case scenarios, might cause deformation in the housing wall. The previously-known differential housings have a wall with a somewhat uniform thickness at the high stress areas. Previous attempts to remedy high stress areas have involved flange-like projections provided along the window peripheries, or have involved enlarging the overall size of the differential housing. The flange-like projections have a somewhat steep step where stresses can be concentrated. While these attempts are suitable in some circumstances, they may undesirably increase the mass of the housing and may breach packaging constraints. The attempts might also create unwanted manufacturing complexities.

Referring again to FIGS. 1-3, protuberances are provided at the identified high stress areas in the wall 24 of the differential housing 10. As perhaps shown best in FIG. 2, in this embodiment there are a total of four protuberances at the cast section 12 and near corners of the first and second windows 32, 34—a first protuberance 44, a second protuberance 46, a third protuberance 48, and a fourth protuberance 50. Other embodiments could have other quantities of protuberances such as a single protuberance, two protuberances, three protuberances, or five protuberances. The protuberances 44, 46, 48, 50 furnish thickened portions of the wall 24 in the sense that a thickness dimension at the protuberances is greater than a thickness dimension at wall portions immediately surrounding the protuberances. In one specific example, a maximum thickness dimension of the wall 24 at the protuberances 44, 46, 48, 50 is approximately 9.0 millimeters (mm), and a thickness dimension at the immediately-surrounding wall portion is approximately 6.0 mm, giving a thickness difference of approximately 3.0 mm. The thickness difference (e.g., 3.0 mm) constitutes the additional thickness provided by the protuberances 44, 46, 48, 50. Put another way, the maximum thickness of the wall 24 at the protuberances 44, 46, 48, 50 may be approximately one-hundred-and-fifty percent (150%) greater than a thickness of the immediately surrounding wall portion. Of course, other examples will have other thickness dimensions and will be greater by other percentages. Material may be added at an exterior side of the wall 24 to establish the protuberances 44, 46, 48, 50. The protuberances 44, 46, 48, 50 may resemble a raised bulge at the exterior surface 28. Material may not necessarily be taken away from the interior surface 26 beneath the protuberances 44, 46, 48, 50, so that the overall thickness of the wall 24 at the protuberances is increased compared to immediately surrounding wall portions, as perhaps illustrated best by the close-up of the first protuberance 44 in FIG. 4.

The protuberances 44, 46, 48, 50 strengthen and reinforce the wall 24 of the differential housing 10 at the high stress areas so that the stresses can be readily endured thereat. The protuberances 44, 46, 48, 50 possess a geometry and arrangement that only minimally, and acceptably, increases mass of the wall 24, and still satisfies packaging constraints. And yet the protuberances 44, 46, 48, 50 are compatible with and facilitate casting processes, as described in more detail below.

The first protuberance 44 is now described with reference to FIG. 4. Since the protuberances 44, 46, 48, 50 in this embodiment are similar in geometry and arrangement, the description below is pertinent to all of the protuberances. As depicted, the protuberance 44 has an elongated cone-like shape, and is bounded by a widened end 52, a narrowed end 54, a first side 56, and a second side 58. The widened and narrowed ends 52, 54 constitute terminal ends of the protuberance 44, and likewise the first and second sides 56, 58 constitute terminal sides of the protuberance. The widened end 52 is situated immediately at the periphery 36 of the first window 32, and extends partway up the periphery toward the first sleeve 18, as perhaps demonstrated best by FIG. 3. An extent 60 closer to the sleeve 18 remains free of the thickness furnished by the protuberance 44. Referring again to FIG. 4, the narrowed end 54, on the other hand, is situated away from the periphery 36 and closer to the first notch 40. A distance taken between the widened end 52 and narrowed end 54 constitutes a greatest longitudinal extent B of the protuberance 44. The greatest longitudinal extent B may be the greatest lengthwise measurement of the protuberance 44, and also establishes a longitudinal direction in this embodiment. The greatest longitudinal extent B happens to be generally in-line with and parallel to the circumferential direction here, though need not be in other embodiments.

Figure 4:
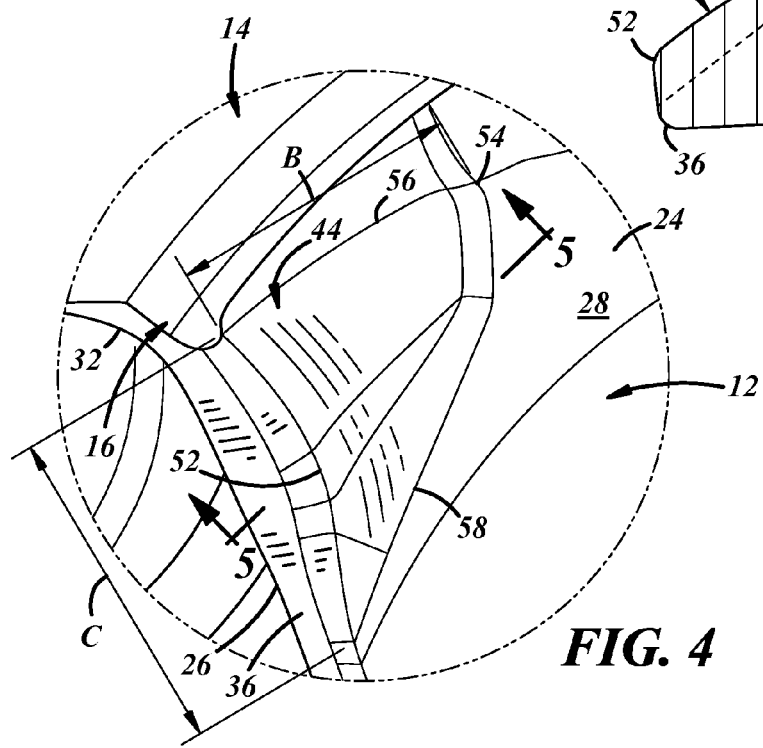
FIG. 4 is an enlarged view of an embodiment of a protuberance of the vehicle differential housing, the enlarged view taken at circle 4 in FIG. 3.

Still referring to FIG. 4, the first and second sides 56, 58 extend between the widened and narrowed ends 52, 54. The first side 56 is situated near the lead-in edge 16, and the second side 58 is situated farther away from the lead-in edge. Distances taken between the first side 56 and second side 58 constitute lateral extents of the protuberance 44. The lateral extents establish a lateral direction in this embodiment, which happens to be generally in-line with and parallel to the axial direction here, though need not in other embodiments. A greatest lateral extent C of the protuberance 44 exists at the widened end 52, and is established by taking a shortest lateral width between the first and second sides 56, 58 at the widened end. In this embodiment, the greatest lateral extent C has a value that is less than a value of the greatest longitudinal extent B—in other words, the protuberance 44 is longer than it is wide. In other embodiments, the greatest lateral extent C could have a value that is greater than a value of the greatest longitudinal extent B—in other words, the protuberance 44 could be wider than it is long. As depicted in FIG. 4, the first and second sides 56, 58 converge toward each other from the widened end 52 and to the narrowed end 54. A shortest distance measured in the lateral direction between the first and second sides 56, 58 steadily decreases in dimension from the widened end 52 and to the narrowed end 54. The decrease could be a constant value, or could vary in value.

Figure 5:
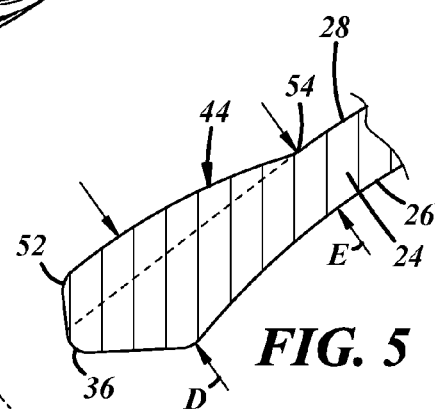
FIG. 5 is a sectional view of the protuberance taken at the arrowed line 5-5 in FIG. 4.

The thickened wall portion provided by the protuberance 44 blends into its surrounding non-thickened wall portions at the boundaries of the protuberance, and does not have a steep step transition like that provided by the previously-known flange-like projections. Referring now to the cross-sectional view of FIG. 5, a thickness of the wall 24 at the protuberance 44 is a measurement taken between the interior surface 26 and the exterior surface 28. The thickness of the protuberance 44 itself is a measurement taken between the exterior surface 28 and the broken line depicted in FIG. 5. Indeed, without the protuberance 44, the exterior surface 28 would continue its extension at the broken line. The greatest thickness of the protuberance 44 itself may be less than the greatest longitudinal extent B and/or less than the greatest lateral extent C. In this way, the protuberance 44 provides a gradual and ramp-like transition to the non-thickened wall portions.

In this embodiment, the thickness is generally in-line with and parallel to the radial direction, though need not be in other embodiments. A first thickness D taken at the widened end 52 and taken about laterally midway between the first and second sides 56, 58 may constitute a greatest thickness dimension of the wall 24 at the protuberance 44. In contrast, a second thickness E taken near or at the narrowed end 54 may constitute a smallest thickness dimension of the wall 24 at the protuberance 44. Between the first and second thicknesses D, E, the thickness dimension may steadily decrease in value. The decrease could be constant, or could vary slightly. Put another way, the protuberance 44 tapers in thickness from the widened end 52 and to the narrowed end 54. Similarly, a thickness taken at the first and second sides 56, 58 may equal the smallest thickness dimension of the protuberance 44. And the thickness dimension from about a lateral midpoint of the widened end 52 and toward the first and second sides 56, 58 may steadily decrease in value, as perhaps illustrated best by FIG. 4.

The longitudinal and lateral extents and decreasing thicknesses of the protuberances present a geometry and arrangement that not only strengthens the wall 24 where needed, but also minimally and acceptably increases the mass of the differential housing 10, and minimally and acceptably adds to the size and packaging of the housing. In regard to packaging, the protuberances have a limited radially-outward extension relative to the semi-spherical shape of the cast section 12. This allows the differential housing 10 to fit within tightly packaged spaces. Furthermore, the blended thicknesses are compatible with and facilitate the casting process carried out at the cast section 12. The protuberances lack sudden and sizable thickness variations. Previously-known flange-like projections, in contrast, present sharp changes in thickness that can sometimes hinder castability. For instance, getting material to flow at the sharp changes amid casting can be challenging; and uneven solidification could occur which tends to produce porosity defects in the material.

It is to be understood that the above description is intended to be illustrative and not restrictive. Many embodiments and applications other than the examples provided would be apparent to those of skill in the art upon reading the above description. The scope of the invention should be determined, not with reference to the above description, but instead with reference to the appended claims, along with the full scope of equivalents to which such claims are entitled. It is anticipated and intended that future developments will occur in the arts discussed herein, and that the disclosed assemblies and methods will be incorporated into such future embodiments. In sum, it should be understood that the invention is capable of modification and variation that is limited only by the following claims.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. A vehicle differential housing, comprising:
a wall having at least one window that provides access to a differential gear disposed at least partly in the vehicle differential housing when assembled, said wall having at least one protuberance at an exterior surface of said wall and adjacent said at least one window, said at least one protuberance providing a thickened portion of said wall to strengthen said wall against stresses experienced amid use of the vehicle differential housing, said at least one protuberance having a greatest longitudinal extent larger than a greatest lateral extent, said greatest longitudinal extent spanning generally from a periphery of said at least one window and away from said periphery, said greatest lateral extent spanning generally along a portion of said periphery, wherein said at least one protuberance has a greatest thickness dimension at said periphery of said at least one window.

2. A vehicle differential housing as set forth in claim 1, wherein said at least one window includes a first window that provides access to the differential gear and includes a second window that provides access to the differential gear, said at least one protuberance comprises a first pair of protuberances at said exterior surface and adjacent opposite sides of said first window, said at least one protuberance comprises a second pair of protuberances at said exterior surface and adjacent opposite sides of said second window, said at least one protuberance being one of said first pair of protuberances or being one of said second pair of protuberances.

3. A vehicle differential housing as set forth in claim 1, wherein said wall has a cast section and a machined section, said at least one protuberance located at said cast section, said greatest lateral extent beginning at a transition between said cast section and said machined section and spanning away from said transition along said periphery.

4. A vehicle differential housing as set forth in claim 1, wherein said at least one protuberance has a widened end and a narrowed end, said greatest longitudinal extent spans between said widened end and said narrowed end, said widened end situated at said periphery, said narrowed end situated away from said periphery.

5. A vehicle differential housing as set forth in claim 4, wherein a lateral width of said at least one protuberance decreases in dimension from said widened end and to said narrowed end.

6. A vehicle differential housing as set forth in claim 1, wherein said greatest longitudinal extent is a greatest circumferential extent relative to the shape of said wall, said greatest lateral extent is a greatest axial extent relative to the shape of said wall.

7. A vehicle differential housing as set forth in claim 1, wherein a thickness of said at least one protuberance decreases in dimension along said greatest longitudinal extent from said periphery and to a location away from said periphery.

8. A vehicle differential housing as set forth in claim 1, wherein a thickness of said at least one protuberance decreases in dimension along a lateral direction of said at least one protuberance.

9. A vehicle differential housing as set forth in claim 1, wherein said wall has a notch at said exterior surface of said wall, said greatest longitudinal extent of said at least one protuberance terminates before spanning to said notch.

10. A vehicle differential housing, comprising:

a wall having at least one window that provides access to a differential gear disposed at least partly in the vehicle differential housing when assembled, said wall having a protuberance at an exterior surface of said wall and adjacent said at least one window, said protuberance having a widened end and a narrowed end, said widened end situated at a periphery of said at least one window, said narrowed end situated away from said periphery of said at least one window, said protuberance having a first side and a second side, a shortest distance between said first side and said second side decreasing from said widened end and to said narrowed end.

11. A vehicle differential housing as set forth in claim 10, wherein a shortest distance between said widened end and said narrowed end is larger than a greatest extent of said widened end taken along said periphery of said at least one window.

12. A vehicle differential housing as set forth in claim 10, wherein a first thickness of said protuberance at said widened end is greater than a second thickness of said protuberance at said narrowed end.

13. A vehicle differential housing as set forth in claim 12, wherein a thickness of said protuberance decreases in dimension along an extent taken between said widened end and said narrowed end.

14. A vehicle differential housing, comprising:

a wall having at least one window, said wall having a protuberance at an exterior surface of said wall and adjacent said at least one window, said protuberance having a widened end, a narrowed end, a first side, and a second side, a shortest distance between said first side and said second side decreasing from said widened end and to said narrowed end, a longitudinal extent taken between said widened end and said narrowed end being greater than a lateral extent of said widened end taken adjacent a periphery of said at least one window, a thickness of said protuberance decreasing in dimension along the longitudinal extent from said widened end and to said narrowed end.

15. A vehicle differential housing, comprising:

a wall having at least one window that provides access to a differential gear disposed at least partly in the vehicle differential housing, said wall having a protuberance at an exterior surface of said wall and adjacent said at least one window, said protuberance providing a thickened portion of said wall to strengthen said wall against stresses experienced amid use of the vehicle differential housing, said protuberance having a greatest longitudinal extent and a greatest lateral extent, said greatest longitudinal extent spanning from said at least one window and away from said at least one window, said greatest lateral extent spanning along a portion of a periphery of said at least one window, wherein a thickness of said protuberance decreases in dimension along said greatest longitudinal extent from said periphery and to a location away from said periphery.

* * * * *